United States Patent [19]

Kimura

[11] Patent Number: 5,811,135
[45] Date of Patent: Sep. 22, 1998

[54] MOLDING APPARATUS

[75] Inventor: Seiichi Kimura, Nishio, Japan

[73] Assignee: Yugenkaisha Aiko, Nishio, Japan

[21] Appl. No.: 784,317

[22] Filed: Jan. 16, 1997

[30] Foreign Application Priority Data

Aug. 22, 1996 [JP] Japan ...................................... 8-220862

[51] Int. Cl.$^6$ ................................................. B29C 33/20
[52] U.S. Cl. .................. 425/186; 425/451.7; 425/451.9; 425/595; 425/547; 249/163
[58] Field of Search ..................... 425/384, 186, 425/407, 595, 405.2, 547, 451.7, 451.9; 249/163, 165

[56] References Cited

U.S. PATENT DOCUMENTS

| | | | |
|---|---|---|---|
| 4,264,556 | 4/1981 | Kumar et al. | 425/405.2 |
| 4,535,689 | 8/1985 | Putkowski | 425/451.7 |
| 4,797,085 | 1/1989 | Chiang et al. | 425/405.2 |

FOREIGN PATENT DOCUMENTS

| | | |
|---|---|---|
| 5-237867 | 9/1993 | Japan . |
| 3020169 | 10/1995 | Japan . |

*Primary Examiner*—James P. Mackey
*Attorney, Agent, or Firm*—Polster, Lieder, Woodruff & Lucchesi LC

[57] ABSTRACT

A molding apparatus includes a molding box structure with an adjustable internal spacing, a metal mold accommodated in the molding box structure, a thermally expanding, member accommodated in the molding box structure to be arranged in pressure transmitting, relation with the mold member, and a temperature adjuster for adjusting a temperature of the thermally expanding member so that the material thermally expands and contracts. The molding box structure includes a pair of support elements fixed by threaded struts and nuts so that the support plates are spaced from each other. The apparatus further includes an auxiliary pressurizing mechanism including two wedge-shaped plates having respective tapered face, and spaced from each other so that the tapered faces are opposed to each other and so that an overlap between them is adjustable, and an actuator for driving the wedge-shaped plates. The molding box structure has a slide shelf formed on its one side so that the mold is slid onto it as it is moved out of the molding box structure. The temperature adjuster is disposed around and through the thermally expanding material and includes a cooling oil circulated through the thermally expanding member for cooling it and a carbon heater for heating the thermally expanding member.

18 Claims, 5 Drawing Sheets

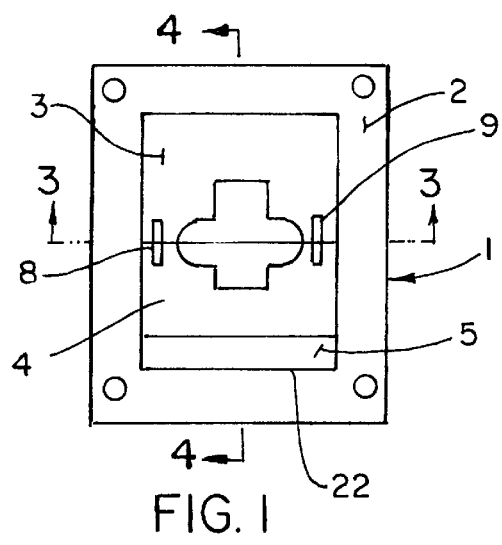
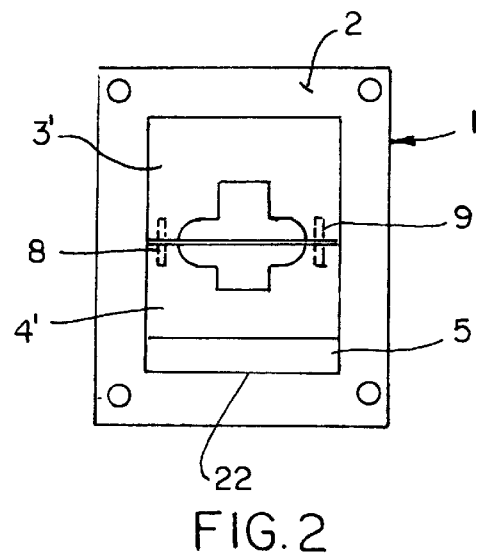
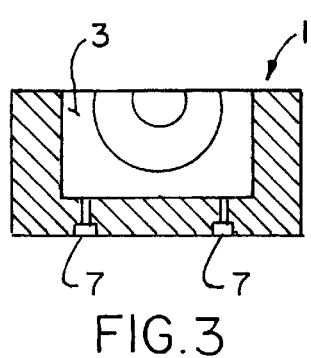
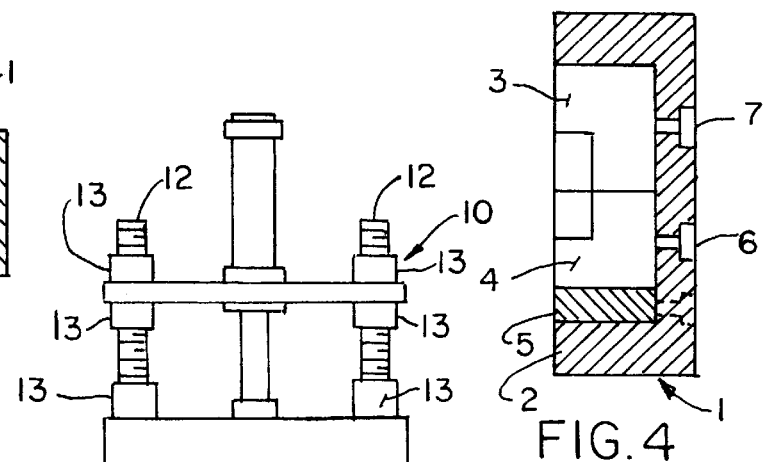
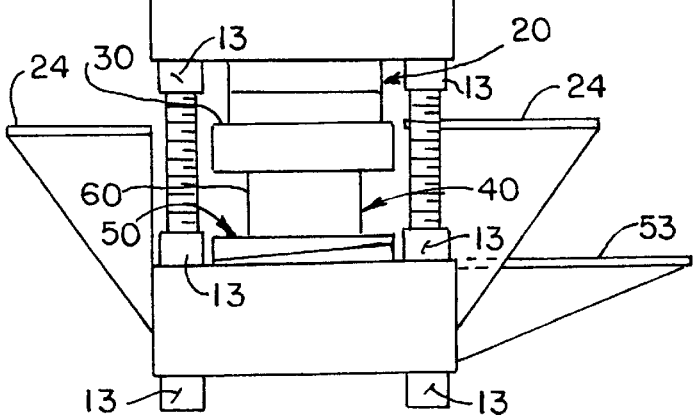

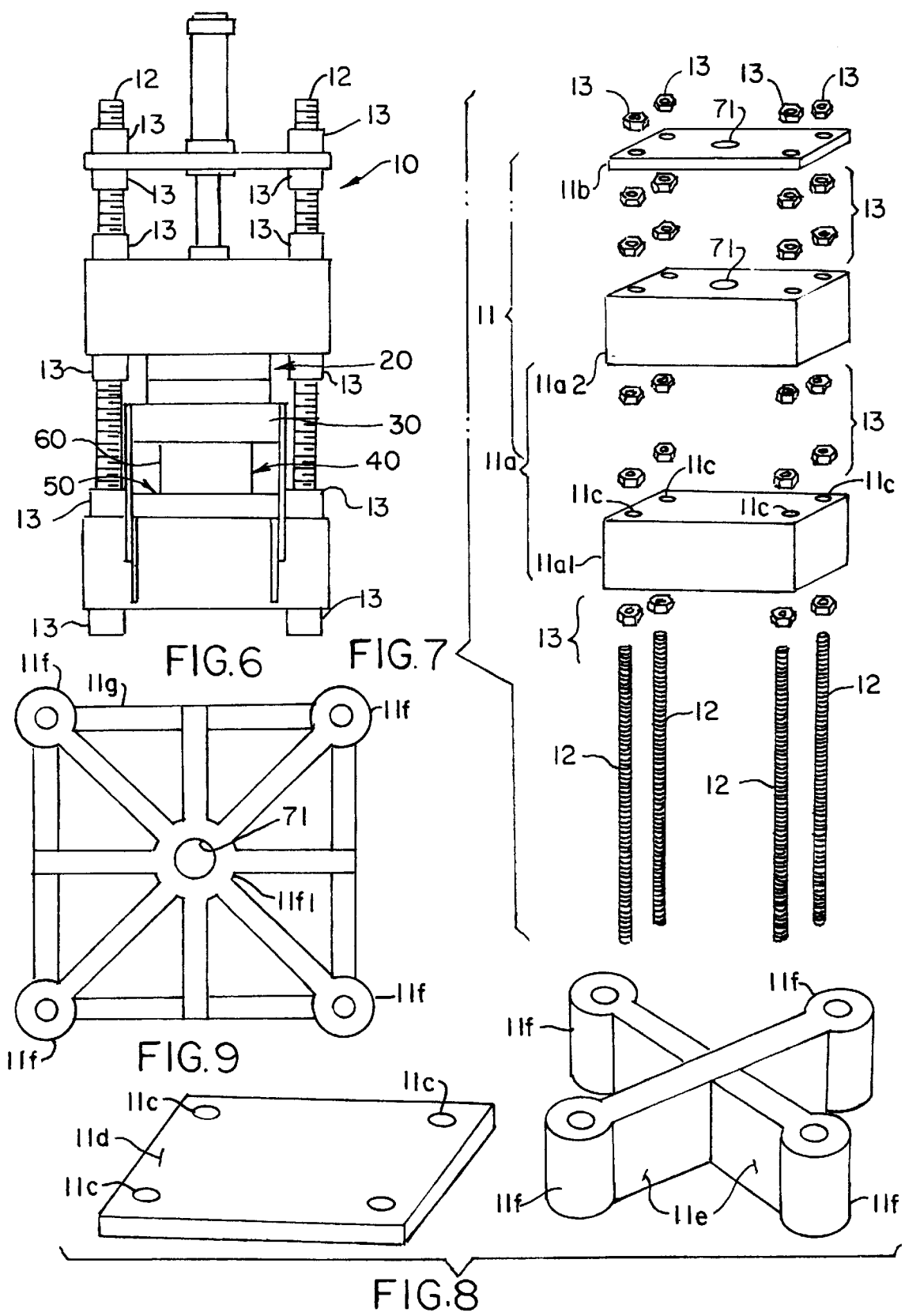

MOLDING APPARATUS

BACKGROUND OF THE INVENTION

This invention relates to a molding apparatus for molding resins or rubber into products.

In conventional molding apparatus, a pair of metal molds are disposed to be opposite to each other, and a hydraulic ram is provided for abutting the metal molds against each other under pressure. Even when a filling pressure of a molten material is sufficiently low relative to the pressure applied to the molds for abutment, there is sufficient give in the hydraulic ram system sometimes to cause the molds to open momentarily, resulting in the formation of flash or fins on the product being melted. This poses a problem. One of the objects of the present invention is to provide a molding apparatus which can prevent the formation of fins and is convenient in use. Other objects will become apparent to those skilled in the art in the light of the following description and accompanying drawing.

BRIEF SUMMARY OF THE INVENTION

In accordance with this invention, generally stated, a molding apparatus is provided comprising in one embodiment a molding box, a split sliding metal mold disposed in the molding box, and a thermally expanding member interposed between the molding box and the sliding mold. The thermally expansive member may be made of any material which both has a high coefficient of thermal expansion and no appreciable resilience or give under the pressures generated in this application, including aluminum alloys, copper and shape memory alloys. Guide means may be provided between split portions of the sliding mold.

In a second embodiment, a molding apparatus comprises a molding box, a sliding metal mold and a fixed metal mold both disposed in the molding box, and a thermally expanding member interposed between the molding box and the sliding mold. Guide means may also be provided between the sliding and fixed molds.

In each of the above-described constructions, the split sliding mold or the sliding and fixed molds, the molds are disposed in the molding box. The thermally expanding member in the form of a block or column of material such as aluminum alloy, copper, or shape memory alloy is interposed between the molding box and the sliding mold. When the thermally expanding member is heated to thereby expand, an extremely high pressure causes the split sliding mold or the sliding and fixed molds disposed in the molding box to press tightly against one another. Furthermore, since the thermally expanding member does not have the give of the (oil) hydraulic ram, the molds are prevented from momentarily opening.

The present invention further provides a molding apparatus comprising a molding box structure with an adjustable internal spacing, a metal mold member accommodated in the molding box structure, a thermally expanding member accommodated in the molding box structure to be arranged in pressure applying relation to the mold member, and temperature adjusting means for adjusting a temperature of the thermally expanding member, alternately heating and cooling the thermally expansive member so that the member thermally expands and contracts. In the preferred embodiment-described, the internal spacing of the molding box structure is adjustable, and the mold member and the thermally expanding member are accommodated in the molding box structure to be arranged with the mold member superposed on the thermally expanding member. The internal spacing of the molding box structure is adjusted in accordance with the thickness of the mold member or the thermally expanding member, or both.

The extent of expansion of the thermally expanding member cannot easily be increased. If only the difference of the thermally expanding member between the expanded state and the contracted state is depended upon to allow the taking of the mold member and the thermally expanding member in and out of the molding box structure, their installation and removal may be somewhat inconvenient. However, the working efficiency can be improved when the internal spacing of the molding box structure is adjustable. Furthermore, the molding box structure can be configured in accordance with the requirements of its application.

The adjustment of the internal spacing of the molding box structure can be accomplished by various mechanical structures. These mechanical structures may include means adjustable in incremental stages or continuously within limits.

In the preferred embodiment, the molding box structure comprises a pair of support elements and a plurality of threaded struts fixed to the support elements by nuts so that the support elements are spaced from each other. The support elements are fixed to the struts by the nuts in this construction. The support elements can be adjusted to the desired spacing by screwing down or backing off the nuts.

According to the above-described construction, the internal spacing of the molding box structure is adjustable in a non-stage, continuous manner through the effective length of threads or the threaded struts.

The molding box structure itself need not be expanded and contracted for adjustment of the inner spacing thereof. The box structure may accommodate auxiliary members the vertical reach of which can be varied effectively so that the internal spacing between the adjustable members and a fixed surface of the molding box structure is varied. An increase in the thickness of the mechanism decreases the internal spacing of the molding box structure, whereas a decrease in its thickness increases the internal spacing of the molding box structure.

The above-described auxiliary pressurizing mechanism may comprise a screwing structure or cam plates moved mechanically, by a motor driven screw mechanism or a hydraulic cylinder and piston. It can also comprise a plurality of shim plates stacked together, the number thereof being increased and decreased as required.

The cam plate mechanism comprises two wedge-shaped plates, one of which is anchored against movement and the other of which is moveable.

The cam plates are overlapped,. and the moveable plate moved relative to the fixed plate. The total thickness of the plates decreases with decrease in the overlap and increases with increase in the overlap. The total thickness of the plates is gradually varied in accordance with the overlap. The overlap may be manually or hydraulically or electrically adjusted.

Because the cam plates are moved toward greater overlap before pressure is applied to the mold and are moved away from greater overlap after the pressure is released, the movement can be accomplished by application of a small force.

Putting a heavy mold into and out of the molding box structure is troublesome even when the internal spacing of the structure is variable. To facilitate moving the hot and heavy mold member disposed in the upper interior of the molding box structure, a slide shelf is formed on a side of the molding box structure so that the mold member can be slid out of the molding box structure onto the slide shelf. A mold take-out actuator is provided for pushing the mold member onto the slide shelf. In this construction, the actuator pushes the mold member out of the molding box structure onto the slide shelf. Thus, since the mold member can easily be taken out of the molding box structure without manual operation even when the mold member is heavy, the working efficiency can further be improved.

To provide more efficient temperature adjustment, temperature adjusting means are disposed to extend through the thermally expanding member. In this construction, the temperature of the thermally expanding member is adjusted internally thereof. As a result, heating and cooling can be carried out efficiently.

To achieve more efficient cooling, the above-described temperature adjusting means controls means for circulating a cooling fluid such as oil through the thermally expanding member. The cooling fluid is circulated through a path extending through the thermally expanding member thereby to absorb heat inside the thermally expanding member and dissipate the heat outside the thermally expanding member. Consequently, necessary cooling can be carried out at an early stage of the molding by the use of a cooling oil with a high boiling point.

To carry out the heating efficiently, the heating element of the temperature adjusting means comprises a carbon heater. The carbon heater generates heat in accordance with electric energy supplied thereto. A normal heating wire burns out when electric energy supplied thereto exceeds a predetermined amount. However, the carbon heater allows the heating to be continued until a desired pressure is produced. As the result of use of the carbon heater, a necessary amount of heat can be supplied without burnout of the carbon heater.

To efficiently fill the molding box structure with a molten material, the molding box structure includes a cylinder provided at a side of the molding box structure against which the mold member is abutted, for filling the mold member with the molten material from outside, and a thrusting member is provided in the cylinder for thrusting out the molten material. The molten material is accommodated in the cylinder formed on the molding box structure, and the thrusting member thrusts out the molten material filling the mold member abutted against the inside of the molding box structure.

BRIEF DESCRIPTION OF THE SEVERAL VIEWS OF THE DRAWINGS

In the drawings, FIG. 1 is a somewhat schematic view in front elevation of molding, apparatus of one embodiment in accordance with the present invention;

FIG. 2 is a view corresponding to the view in FIG. 1 of molding apparatus of a modified form;

FIG. 3 is a sectional view taken along line 3—3- in FIG. 1;

FIG. 4 is a sectional view taken along line 4—4 in FIG. 1;

FIG. 5 is a view in front elevation of the molding apparatus of another modified form;

FIG. 6 is a is a view in side elevation of the molding apparatus in FIG. 5;

FIG. 7 is a is an exploded perspective view of the molding box structure;

FIG. 8 is an exploded perspective view of the lowermost support plate of the molding box structure;

FIG. 9 is a plan view of the middle support plate of the molding box structure;

DETAILED DESCRIPTION OF THE INVENTION

Figure 10:
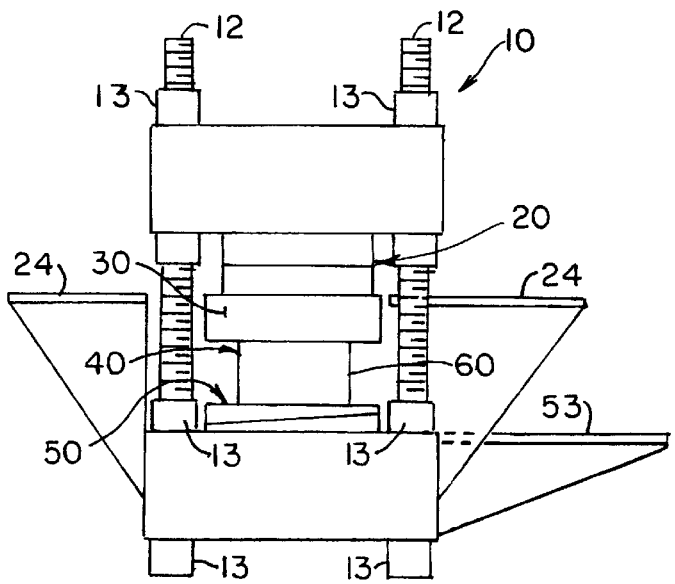
FIG. 10 is a view in front elevation of another embodiment of molding apparatus.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

One illustrative embodiment of the present invention will be described with reference to the drawings. Referring to FIGS. 1, 3 and 4, reference numeral 1 designates a molding apparatus. The molding apparatus 1 includes a molding box 2, a two part (split) metal mold disposed in the molding box 2, that is, an A mold 3 and a B mold 4, and a thermally expanding member 5 interposed between the B mold 4 and an inner face 2a of the molding box 2. Reference numerals 6 and 7 designate set screws used for fixing the A and B molds 3 and 4. Both of the molds 3 and 4 are sliding molds in the embodiment shown in FIG. 1, whereas the molds 3' and 4' are a fixed metal mold and a sliding metal mold respectively in the embodiment shown in FIG. 2. Reference numerals 8 and 9 designate guide pins (guide means).

The mold is not limited to a two-piece mold. Furthermore, the thermally expanding member 5 may be modified depending upon the construction of the split mold or the configuration of the cavity. The mold is of the split type in the present invention. The split molds 3 and 4 are attached to the molding box 2 for sliding movement in the box, for example, by screwing the set screws 6 and 7 into clearance holes (not shown).

Molding by the molding apparatus including the combined molds 3 and 4 will be described. First, the thermally expanding member is heated by supplying electric current to the carbon resistance heater, or by introducing steam or other heated fluid to the thermally expanding member, or by applying heat from another heat source so that the thermally expanding member is expanded, thereby sliding the molds 3 and 4 into tight engagement with one another. A mold cavity defined by the clamped molds 3 and 4 constituting the combined molding apparatus is filled with a thermoplastic material such as rubber or plastic. The molding apparatus is then heated by steam or another heat source so that the thermoplastic material is cured into a manufactured article. Thereafter, the thermally expanding member 5 is contracted such that the molds 3 and 4 are released from the combined state after a predetermined period of time has expired. As a result, the molds 3 and 4 are each in a free state, whereupon these molds can be moved by a small external force. Then, the molded article is taken out of the cavity. The above-described procedures are repeated. The procedures and the number of molds may be changed.

The split type sliding molds 3' and 4' are disposed in the molding box 2, and the thermally expanding member 5 is interposed between the sliding mold and the molding box, as described above.

In each case, the molding apparatus is characterized in that a close combined relationship can be established between the sliding molds in the molding box so that a molding without flash or fins can be obtained. Furthermore, the split sliding mold and the thermally expanding member can easily be disposed in the molding box, and the assembling can easily be carried out.

FIGS. 6 and 7 illustrate a more complete form of the molding apparatus. A molding box structure 10 comprises three support elements 11, four threaded struts 12, and twenty-four nuts 13. A mold member 20, a pressurizing plate 30, a thermally expanding member 40 and an auxiliary pressurizing mechanism 50 are vertically arranged between the lower two support elements 11 in this order from top to bottom. The thermally expanding member 40 includes a temperature adjusting mechanism 60.

Referring to FIG. 7 showing the molding box structure 10, relatively thick support elements 11a1 and 11a2 and a relatively thin support element 11b are vertically spaced from one another and fixed together by the threaded struts 12 which extend through holes 11c formed in four corners of the support elements 11 to be fixed by the nuts 13. Each strut 12 is threaded over its entire length. Two nuts 13 are engaged with each strut 12 on and under each support element 11 respectively. As a result, a space between the support elements 11 can readily be adjusted by the locations of the nuts 13.

Referring to FIGS. 8 and 9, the thicker support element 11a1 comprises a square plate 11d, and cruciform reinforcing beams 11e, terminating in bosses or pipes 11f. The pipes 11f are arranged to correspond to through holes 11c formed in four corners of the square plate 11d. The square plate 11d is disposed on the reinforcing beams 11e. Since the wide dimension of each beam 11e is parallel with a long axis of each strut 12, each beam 11d receives load heightwise. Consequently, each beam 11e achieves a high reinforcing effect. The support element 11a2 differs from the support element 11a1 in that it has, in addition to four bosses or pipes 11f at the four corners, a central, larger diameter bossor pipe 11f1. The pipes 11f are connected to the central boss 11f1 by diagonal beams 11e. The corner pipes 11f are further connected to one another by four framing beams 11g and additional beams connect the pipe 11f1 to the center of each span of the framing beams 11g. The central pipe 11f1 forms a part of a molten material filling structure which will be described later. A square plate similar to the plate 11d, with a hole aligned with the hole 71, can be positioned under the support element 11a2 and above the mold 20.

Although the plates and the beams 11e are described as separate elements of the support elements 11a1 and 11a2 in this embodiment, they may be made in one piece or solid steel block may be used, instead. Furthermore, the support plates may be formed of a material other than metal if the material has a sufficient strength. The space between the support elements 11 is continuously adjustable by the threaded struts 12 and the nuts 13 in the embodiment shown and described. The space adjustments are not necessarily limited to this construction. For example, the support plates may be fixed to the struts at staged locations. The number of struts 12 may be increased or decreased. Furthermore, the diameter of each strut 12 may be changed to accommodate different requirements. For example, larger diameter struts may be disposed in a portion of the support plate where the struts are sparse, whereas smaller diameter struts may be disposed in a portion of the support plate where the struts are dense. Three support plates 11 are disposed in the embodiment shown in FIGS. 5–7. However, two support plates may be used instead if at least the mold member 20 and the thermally expanding member 40 can be accommodated in a space therebetween, as shown in FIG. 10.

Figure 13:
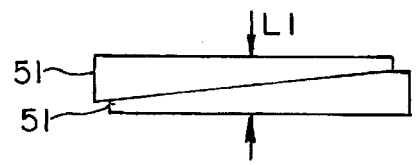
FIG. 13 is a view in side elevation of the cam plates, showing a thick state thereof.
Figure 11:
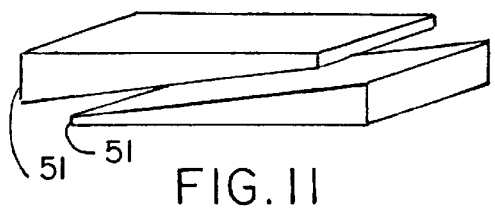
FIG. 11 is a view in perspective illustrating the operation of cam plates of an auxiliary pressurizing mechanism.
Figure 12:
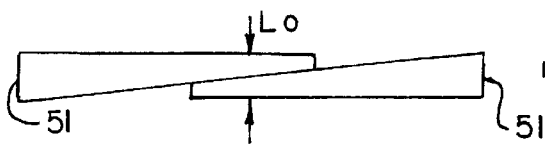
FIG. 12 is a view in side elevation of the cam plates, showing a thin state thereof.

In the embodiment shown, the auxiliary pressurizing mechanism 50 forms the lowermost layer between the support elements 11a1 and 11a2. The auxiliary pressurizing mechanism 50 comprises two wedge-shaped plates 51 having respective tapered faces and laid one upon the other with the tapered faces being opposed to each other. FIGS. 11 to 13 explain the principle of the operation of the wedge-shaped plates. To obtain the greatest thickness, a thinner end of one of the plates 51 is overlapped with a thicker end of the other plate. When only the thinner portions of the plates 51 are overlapped such that the overlap is small, as shown in FIG. 12, the total thickness of the plates is decreased. On the other hand, as the plates 51 are moved to a position of greater overlap, as shown in FIG. 13, the total thickness is increased. In the preferred embodiment, the desired thickness is produced by the maximum overlap to minimize stability.

The above-described auxiliary pressurizing mechanism 50 may or may not be provided. However, without some auxiliary pressure mechanism all of the four struts 12 need to be adjusted when the space between the support plates 11 is adjusted by the struts 12 and the nuts 13. This adjustment is time consuming. As a result, the working efficiency can be improved when the internal spacing is adjusted by using an auxiliary pressurizing mechanism.

Figure 14:
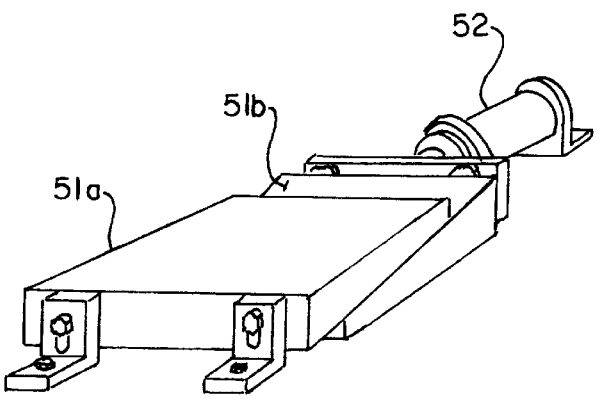
FIG. 14 is a perspective view of the auxiliary pressurizing mechanism with a hydraulic actuator.
Figure 15:
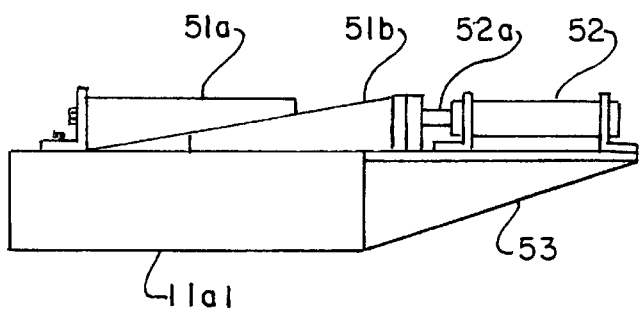
FIG. 15 is a view in side elevation of the auxiliary pressuring mechanism in FIG. 14 showing a thin state thereof.
Figure 16:
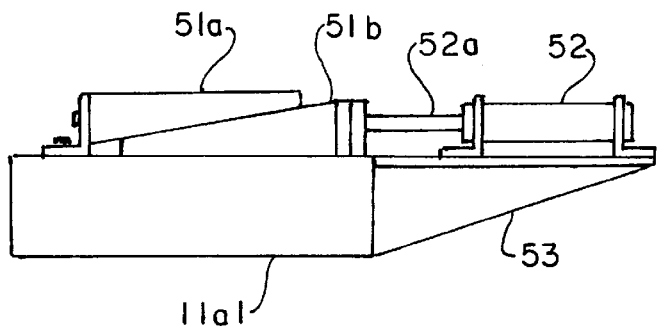
FIG. 16 is a view in side elevation of the auxiliary pressuring mechanism in FIG. 14, showing a thick state thereof.

The overlap of the mechanism 50 may be adjusted manually or mechanically. FIGS. 14 to 16 illustrate a modified form in which the overlap is adjusted by an auxiliary pressurizing actuator using a hydraulic cylinder 52. A table 53 extends from one side of the support element 11a1. The hydraulic cylinder 52 is mounted on the table 53 so that its axis is directed toward the space between the support plates 11a1 and 11a2. The wedge-shaped plate 51a is fixed against lateral movement at the thick end thereof, but to be vertically slideable relative to the support plate 11a1. The thin end of the other wedge-shaped plate 51b is located under the wedge-shaped plate 51a, and a piston 52a of the hydraulic cylinder 52 is connected to the thick end of the wedge-shaped plate 51b.

The overlap between the wedge-shaped plates 51a and 51b is decreased with resultant decrease in the total thickness when the piston 52a is contracted, as shown in FIG. 15, whereas the overlap is increased with resultant increase in the total thickness when the piston 52a is extended. The thickness adjustment as described above can readily be performed by control of an external hydraulic valve (not shown).

As is apparent, other means for operating the cam plates can be used, such, for example as a manually actuated link and lever or screw, or an electrically operated screw or rack arrangement.

Figure 17:
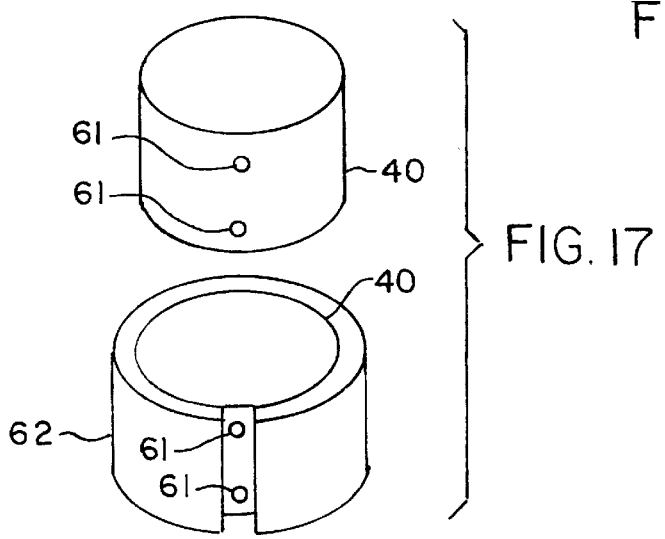
FIG. 17 is an exploded perspective view of a thermally expanding member and a heating element of a temperature adjusting mechanism.
Figure 18:
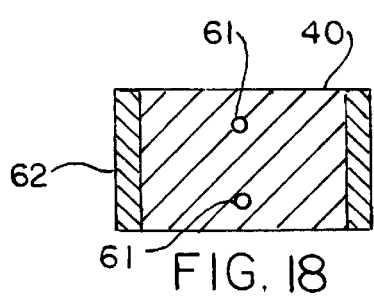
FIG. 18 is a diametric sectional view of the thermally expanding member and the temperature adjusting mechanism.

The thermally expanding member 40 as shown in FIG. 17 is placed on the upper face of the auxiliary pressurizing mechanism 50. The thermally expanding member 40 is formed from a substantially solid columnar material such as an aluminum alloy of JIS H4000 or A7000 system. An aluminum alloy thermally expanding member 40 has a large thermal expansion coefficient and a strength approximately equal to that of iron. The thermally expanding member 40 may or may not be formed from an aluminum alloy. Any material may be used when it has a large thermal expansion coefficient and a high strength. For example, a copper alloy or recently developed high rigid resins may be used.

The thermally expanding member 40 has one or more two-ended cooling fluid passages 61 extending within it or through it. An external pump and radiator (neither shown) are connected to both open ends of each through path 61 so that a cooling oil is supplied through one of the open ends of each passage 61, whereby the cooling oil can be recirculated through each path 61. A cylindrical heater 62 is mounted on and around the thermally expanding member 40 so as to cover the outer circumferential face thereof. A carbon heater is used as a heat source for the heater 62 in this embodiment. The through paths 61 and fluid connections thereto and the heater 62 constitute a temperature adjusting mechanism 60. The temperature adjusting mechanism 60 is provided for the heating and cooling of the thermally expanding member 40. Various changes may be possible with respect to each of the heating and the cooling systems. For example, the oil recirculated through the paths 61 may externally be heated and cooled. In this regard, individual paths 61 may be formed for the heating system and the cooling system. Heating and cooling periods can be shortened when the thermally expanding member 40 is internally heated and cooled. However, the heating and cooling structure becomes complicated. The cooling medium can be liquid or refrigerant gas, for example.

A rectangular, thick pressurizing block 30 is placed on the top of the thermally expanding member 40. The pressurizing block 30 is disposed between the mold member 20 and the thermally expanding member 40 to apply pressure to the mold member 20 irrespective of the sectional shape of the thermally expanding member 40. Although the pressurizing block 30 may or may not be provided, it can apply a uniform pressure in an easy manner when provided.

Figure 19:
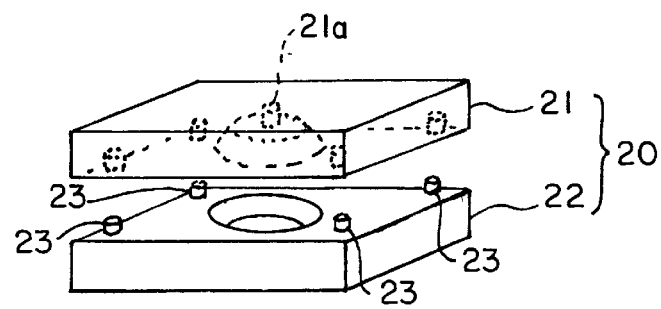
FIG. 19 is an exploded perspective view of a mold member.
Figure 20:
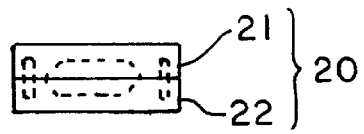
FIG. 20 is a view in front elevation of the mold member.
Figure 21:
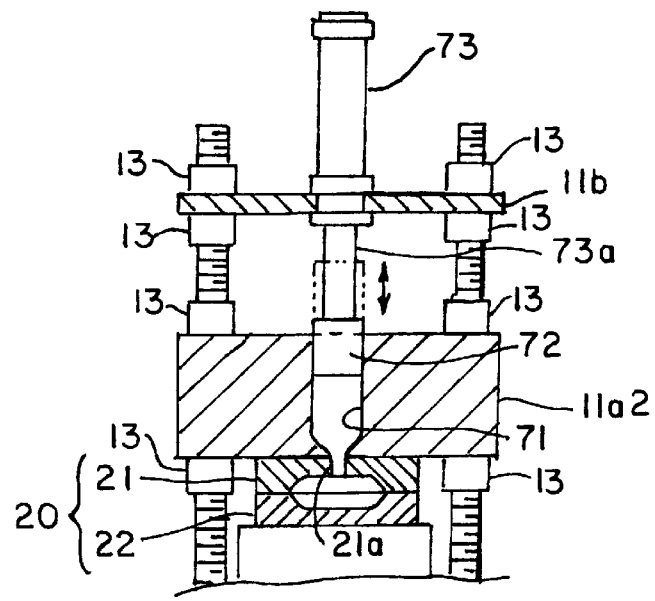
FIG. 21 is a sectional view of a molten material filling mechanism of the molding apparatus.

The mold member 20 is accommodated between the pressurizing plate 30 and the support element 11a2, as shown in FIGS. 19 and 20. The mold member 20 in the preferred embodiment comprises an upper mold 21 and a lower mold 22. The upper and lower molds 21 and 22 have concavities formed in faces opposed to each other, in predetermined configurations, respectively. Each of the molds 21 and 22 further has a plurality positioning pins 23 for preventing lateral misregistration thereof. The upper mold 21 has a material filling hole 21a formed therethrough to correspond to the central cylinder hole 71 formed through the support plate 11a, as shown in FIG. 21. A thrusting piston 72 is insertable into the cylinder hole 71 and is connected to a piston 73a of an oil-hydraulic cylinder mounted on and extending through a central portion of the uppermost support plate 11b. Movement of the piston 73a vertically moves the thrusting piston 72 so that molten material accommodated in the cylindrical hole 71 can fill the interior of the mold member 20 through the material filling hole 21a of the upper mold 21. This kind of arrangement is conventional. The upper and lower molds 21 and 22 are vertically laid one upon the other to be combined. If a multi-part mold is employed, a plurality of thermally expanding members, set between mold parts and inwardly facing surfaces of a framing mold box oriented horizontally, for example, can be used.

The cylinder hole 71 of the support plate 11a2 is formed in the central pipe 11f1 as described above. A molten material filling structure including the cylinder hole 71 and the piston 72 is formed integrally with the support plate 11a2 forming the molding box structure 10. Alternatively, an injection cylinder may be inserted into the pipe 11f1.

Since the mold member 20 has a considerable weight, slide shelves 24 are formed on both sides of the molding box structure 10 to be planar with the underside of the mold member 20 (see FIGS. 5 and 6). The mold member 20 is slid on each slide shelf to be installed or removed. This work may be manual.

Figure 22:
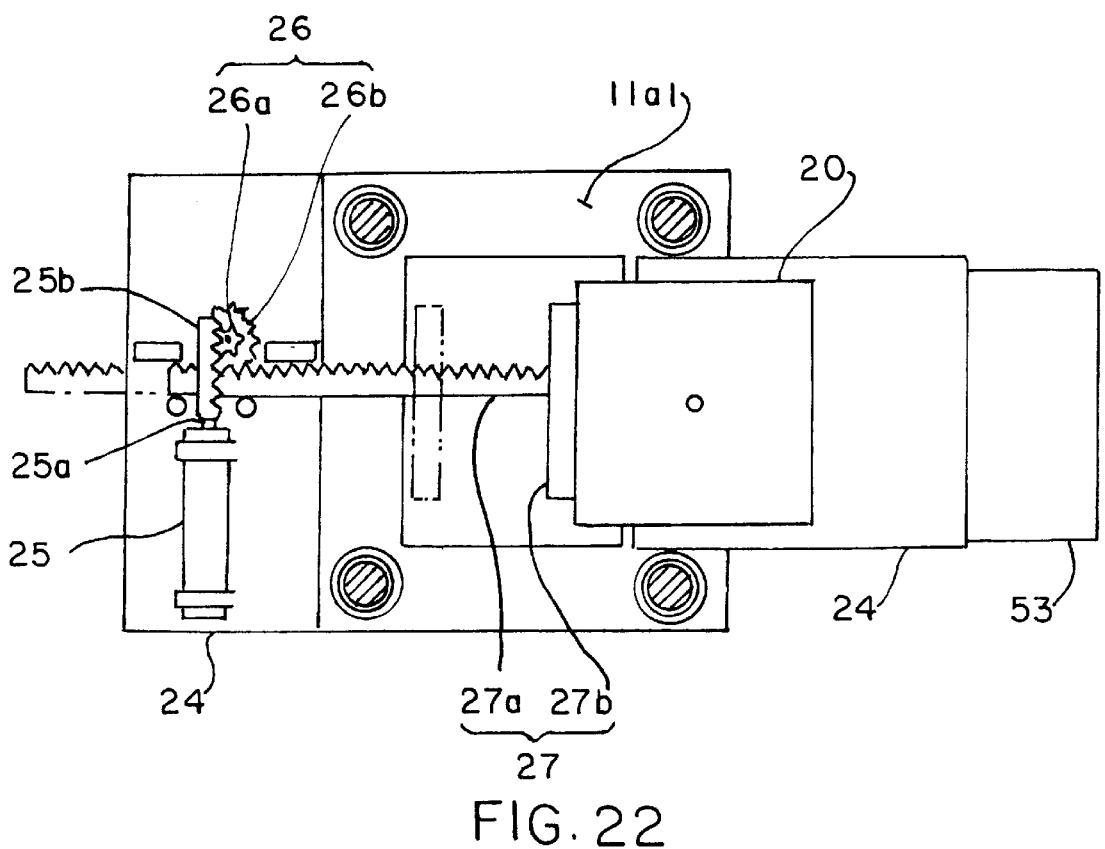
FIG. 22 is a sectional view of an actuator mechanism, mounted on a molding box structure for pushing out the mold member.

Referring to FIG. 22, a mold thrusting actuator is provided for hydraulically performing the mold thrusting work. The actuator is provided with an oil-hydraulic cylinder 25 which is mounted on the upper face of one of the slide shelves 24 together with a step-up gear assembly 26 and a drive arm 27. A rack 25b is connected to the distal end of a piston 25a of the oil-hydraulic cylinder 25 of the gear assembly 26. The drive arm 27 comprises a rack 27a directed to abut against a side of the mold member 20 and mounted for forward and backward movement and an abutting arm 27b mounted on the distal end of the rack 27a. The rack 27a is connected to a lower large diameter gear 26b of the step-up gear assembly 26. The axial movement of the piston 25a is converted by the step-up gear assembly 26 to a large stroke, whereby the mold member 20 can be thrust out on the other slide shelf 24 opposite the shelf on which the mold thrusting actuator is mounted.

Although the hydraulically operated actuator is used in the embodiment, another actuator such as an electric motor may be used, instead. The drive mechanism for sliding the mold member 20 to thrust it out may be modified. Furthermore, the drive mechanism may be provided for drawing in the mold member as well as for thrusting out the same.

The operation of the molding apparatus will be described. By way of illustration, the thermally expanding member 40 has a thickness of 150 mm. The incremental height gain due to thermal expansion ranges to 5 mm. The mold member 20 has a thickness of 100 mm. The thickness adjustment of the auxiliary pressurizing mechanism 50 ranges between 45 and 55 mm. The space between the lowermost support element 11a1 and the middle support element 11a2 is set at 405 mm. The following description is based on these conditions.

The distance between the mechanism 50 and the upper face of the pressurizing plate 30 is 295 mm when the thickness of the auxiliary pressurizing mechanism 50 is at the lower limit 45 mm during cooling of the thermally expanding member 40. In this case, the space between the pressurizing plate 30 and the middle support plate 11a2 is 110 mm. Since the thickness of the mold member 20 is 100 mm, it can easily be put into and taken out of the molding box structure.

When the mold member 20 has been moved from the sliding shelf 24 to the upper face of the pressurizing plate 30, a space of about 10 mm is defined over the mold member 20. The overlap between the wedge-shaped plates 51 of the auxiliary pressurizing mechanism 50 is increased so that the plates 51 completely overlap one upon the other, whereby the mold member 20 is moved into contact with or immediately adjacent the lower surface of plate 11a2.

Subsequently, when the thermally expanding member 40 is heated by the heater 62, the mold member 20 is sufficiently clamped due to thermal expansion of the member 40 to preclude the formation of flash. Since the thermally expanding member 40 has substantially no elasticity, the pressure caused by the thermally expanding member 40 is sufficient if it is higher than the filling pressure of the molten material.

The upper cylinder hole 71 is filled with the molten material such as rubber after the mold has been put under compressive pressure. When the piston 72 is thrust into the cylinder 71 by the oil-hydraulic cylinder 73, the molten material is caused to fill the interior of the mold member 20 through the material filling hole 21a. After completion of the filling work, the heating by the heater 62 is stopped and the cooling oil is circulated through the through paths 61 formed in the thermally expanding member 40. In this illustrative embodiment, the thermally expanding member 40 is expanded and contracted in a cycle of about one-minute heating and three-minute cooling.

After completion of the cooling, the overlap between the wedge-shaped plates 51 of the auxiliary pressurizing mechanism 50 is decreased so that the total thickness of the plates 51 is reduced. Consequently, since a sufficient space is ensured between the mold member 20 and the support plate 11a2, the mold member 20 is thrust onto the sliding shelf 24 and the molds 21 and 22 of the mold member 20 are parted so that the product can be taken out.

As described above, the molding box structure 10 comprises the support elements 11a1, 11a2 and 11b which are fixed by the four threaded struts 12 and the nuts 13 so as to be spaced from one another. The mold 20, the pressurizing plate 30, the thermally expanding member 40 and the auxiliary pressurizing mechanism 50 are accommodated in the molding box structure 10 to be vertically arranged between the lower two support elements 11 in this order. The thermally expanding member 40 is heated to be expanded after the space is sufficiently reduced by the auxiliary pressurizing mechanism 50. The stroke due to the expansion of the thermally expanding member 40 is utilized to pressurize the mold member 20. Consequently, the adjustment of space can easily be carried out as in the case where a hydraulic press is used, and a large pressure can be obtained.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

I claim:

1. A molding apparatus comprising:
   a molding box; a split sliding metal mold disposed in the molding box, said split sliding mold being in sections, at least one of which sections slides relative to another of said sections, between a position at which said sections are engaged and a position at which said sections are separated;
   a thermally expanding member interposed between the molding box and the sliding section of said mold, and means for selectively heating said thermally expanding member whereby to clamp said mold sections in tight engagement with one another and means for selectively cooling said thermally expanding member to release said split mold.

2. A molding apparatus according to claim 1, further comprising guide means provided between split portions of the sliding mold.

3. The molding apparatus of claim 1, wherein said thermally expanding member is made from a material selected from the group consisting of aluminum alloys, copper and shape memory alloys.

4. A molding apparatus comprising;
   a molding box;
   a sliding metal mold and a fixed metal mold both disposed in the molding box; and
   a thermally expanding member interposed between the molding box and the sliding mold and means for selectively heating and cooling said thermally expanding member.

5. The molding apparatus of claim 4 wherein said thermally expanding member is made from a material selected from the group consisting of aluminum alloys, copper and shape memory alloys.

6. A molding apparatus according to claim 4, further comprising guide means provided between the sliding and fixed molds.

7. A molding apparatus comprising;
   a molding box structure with an adjustable internal spacing;
   a metal mold member accommodated in the molding box structure;
   a thermally expanding member accommodated in the molding box structure to be arranged in pressure transmitting relation with the mold member; and
   temperature adjusting means for adjusting a temperature of the thermally expanding member so that the thermally expanding member thermally expands and contracts.

8. A molding apparatus according to claim 7, wherein the molding box structure comprises a pair of support elements fixed by a plurality of threaded struts and nuts so that the support elements are spaced from each other.

9. A molding apparatus according to claim 7, further comprising an auxiliary pressurizing mechanism accommodated in the molding box structure between said thermally expanding member and a fixed surface of said molding box structure, said auxiliary pressurized mechanism having an adjustable thickness.

10. A molding apparatus according to claim 8, further comprising an auxiliary pressurizing mechanism accommodated in the molding box structure between said thermally expanding member and a fixed surface of said molding box structure, said auxiliary pressurized mechanism having an adjustable thickness.

11. A molding apparatus according to claim 9, wherein the auxiliary pressurizing mechanism comprises two wedge-shaped plates having respective tapered faces and overlying each other so that the tapered faces thereof are opposed to each other and so that an overlap therebetween is adjustable.

12. A molding apparatus according to claim 11, wherein the auxiliary pressurizing mechanism has an auxiliary pressurizing actuator for driving the wedge-shaped plates.

13. A molding apparatus according to claim 7, wherein the mold member is disposed in an upper interior of the molding box structure and the molding box structure has a slide shelf formed on a side of the molding box structure so that the mold member is slid on the slide shelf to be moved out of the molding box structure.

14. A molding apparatus according to claim 13 further comprising a mold takeout actuator for thrusting the mold member onto the slide shelf.

15. A molding apparatus according to claim 7 wherein said temperature adjusting means is disposed through the thermally expanding member.

16. A molding apparatus according to claim 15, wherein the temperature adjusting means includes a cooling oil circulated through the thermally expanding member for cooling the thermally expanding member.

17. A molding apparatus according to claim 15, wherein the temperature adjusting means includes a carbon heater for heating the thermally expanding member.

18. A molding apparatus according to claim 15, wherein said molding box structure includes a cylinder provided at a side thereof against which the mold member is abutted, for filling the mold member with a molten material from outside, and a thrusting member provided in the cylinder for thrusting out the molten material.

* * * * *